United States Patent
Zhang et al.

(10) Patent No.: US 11,287,708 B2
(45) Date of Patent: Mar. 29, 2022

(54) LIQUID CRYSTAL DISPLAY PANEL, COLOR FILM SUBSTRATE, AND THIN FILM TRANSISTOR SUBSTRATE

(71) Applicant: Wuhan China Star Optoelectronics Technology Co., Ltd., Wuhan (CN)

(72) Inventors: Qipei Zhang, Wuhan (CN); Yun Yu, Wuhan (CN)

(73) Assignee: Wuhan Ching Star Optoelectronics Technology Co., Ltd., Wuhan (CN)

( * ) Notice: Subject to any disclaimer, the term of this patent is extended or adjusted under 35 U.S.C. 154(b) by 217 days.

(21) Appl. No.: 16/613,916

(22) PCT Filed: Dec. 26, 2018

(86) PCT No.: PCT/CN2018/123813
§ 371 (c)(1),
(2) Date: Nov. 15, 2019

(87) PCT Pub. No.: WO2020/087727
PCT Pub. Date: May 7, 2020

(65) Prior Publication Data
US 2021/0341805 A1   Nov. 4, 2021

(30) Foreign Application Priority Data

Oct. 31, 2018   (CN) .......................... 201811284649.5

(51) Int. Cl.
*G02F 1/1362*  (2006.01)
*G02F 1/1368*  (2006.01)

(52) U.S. Cl.
CPC ...... *G02F 1/136222* (2021.01); *G02F 1/1368* (2013.01); *G02F 1/136209* (2013.01)

(58) Field of Classification Search
CPC .................................................. G02F 1/136222
See application file for complete search history.

(56) References Cited

U.S. PATENT DOCUMENTS

| | | | |
|---|---|---|---|
| 2013/0155367 A1* | 6/2013 | Tomioka | G02F 1/1368 349/155 |
| 2014/0198284 A1* | 7/2014 | Weng | G02F 1/13394 349/106 |
| 2016/0077369 A1* | 3/2016 | Kim | G02F 1/136286 349/43 |
| 2016/0103354 A1* | 4/2016 | Lee | G02F 1/1337 349/123 |
| 2019/0043895 A1* | 2/2019 | Shen | G06F 3/0412 |

FOREIGN PATENT DOCUMENTS

| | | | | |
|---|---|---|---|---|
| CN | 101046562 | * | 10/2007 | ............. G02F 1/133 |
| CN | 101334561 | * | 12/2008 | ........... G02F 1/1333 |

* cited by examiner

*Primary Examiner* — Sang V Nguyen (57) ABSTRACT

The present invention provides a liquid crystal display (LCD) panel comprising a color film substrate, a thin film transistor substrate, and a photo spacer. Wherein the photo spacer is disposed on the color film substrate or/and the thin film transistor substrate. The color film substrate or/and the thin film transistor substrate are provided with a recess. At least a portion of the photo spacer disposed on one of the color filter substrate and the thin film transistor substrate and the recess disposed on the other of the color filter substrate and the thin film transistor substrate are nested.

3 Claims, 14 Drawing Sheets

LIQUID CRYSTAL DISPLAY PANEL, COLOR FILM SUBSTRATE, AND THIN FILM TRANSISTOR SUBSTRATE

FIELD OF INVENTION

The present invention relates to the field of display technologies, and in particular, to a liquid crystal display panel, a color film substrate, and a thin film transistor substrate.

BACKGROUND OF INVENTION

With the market demand for liquid crystal panels, high aperture ratio and high pixel density have become important targets for panel design. The higher the display density, the smaller the pixel size. When photo spacers (PSs) between a color filter substrate and a thin film transistor are subjected to an external force such as being squeezed or dropped, a positional movement of the photo spacers occurs, and after the movement, it will destroy an alignment of alignment liquid and cause a disorder of liquid crystals, which forms a display defect such as a bright spot.

Technical Problem

In current liquid crystal display panels, when photo spacers are subjected to an external force such as being squeezed or dropped, a positional movement occurs, and after the movement, it will destroy an alignment of alignment liquid and cause a disorder of liquid crystals, which forms a display defect such as a bright spot.

Technical Solution

A liquid crystal display (LCD) panel, comprises:
a color film substrate;
a thin film transistor substrate; and
a photo spacer disposed between the color film substrate and the thin film transistor substrate;
wherein the photo spacer is disposed on the color film substrate or/and the thin film transistor substrate, the color film substrate or/and the thin film transistor substrate are provided with a recess, at least a portion of the photo spacer disposed on one of the color filter substrate and the thin film transistor substrate and the recess disposed on the other of the color filter substrate and the thin film transistor substrate are nested.

Preferably, the photo spacer is disposed on the thin film transistor substrate, and the recess for inserting the photo spacer is disposed on a protective layer of the color filter substrate.

Preferably, the thin film transistor substrate comprises:
a second substrate;
a semiconductor layer disposed on the second substrate;
a gate insulating layer disposed on the semiconductor layer;
an interlayer insulating layer disposed on the gate insulating layer;
a second metal layer disposed on the interlayer insulating layer;
a flat layer disposed on the interlayer insulating layer and covering the second metal layer; and
a pixel electrode disposed on the flat layer;
wherein the flat layer is provided with at least two spaced-apart vias, and the photo spacer is disposed between two adjacent vias Preferably, a first passivation layer is disposed on the pixel electrode, and the photo spacer is disposed on the first passivation layer.

Preferably, a top of the first passivation layer is provided with a first convex portion, and a bottom of the photo spacer is provided with a first concave portion for inserting the first convex portion.

Preferably, a first groove is provided on the first passivation layer for inserting the photo spacer.

Preferably, a touch layer is disposed on the pixel electrode, and the photo spacer is disposed above the touch layer Preferably, a second passivation layer is disposed on a top of the touch layer, and the photo spacer is disposed on the second passivation layer.

Preferably, a top of the second passivation layer is provided with a second convex portion, and a bottom of the photo spacer is provided with a second concave portion for inserting the second convex portion.

Preferably, a second groove is provided on the second passivation layer for inserting the photo spacer.

The invention further provides a color film substrate, comprises:
a first substrate;
a black matrix disposed on the first substrate;
a pixel layer disposed on the black matrix; and
a protective layer disposed on the pixel layer;
wherein the protective layer is provided with a photo spacer or/and a recess; the photo spacer on the color filter substrate is used for nesting with a recess on a thin film transistor substrate to be integrated with the color filter substrate, and the recess on the color filter substrate is used for nesting with a photo spacer on the thin film transistor substrate to be integrated with the color filter substrate.

The invention further provides a thin film transistor substrate, comprises:
a second substrate;
a semiconductor layer disposed on the second substrate;
a gate insulating layer disposed on the semiconductor layer;
an interlayer insulating layer disposed on the gate insulating layer;
a second metal layer disposed on the interlayer insulating layer;
a flat layer disposed on the interlayer insulating layer and covering the second metal layer; and
a pixel electrode disposed on the flat layer;
wherein the flat layer is provided with at least two spaced-apart vias, a photo spacer or/and a recess is disposed on the flat layer between two adjacent vias, the photo spacer on the color filter substrate is used for nesting with a recess on a thin film transistor substrate to be integrated with the color filter substrate, and the recess on the color filter substrate is used for nesting with a photo spacer on the thin film transistor substrate to be integrated with the color filter substrate.

Benefical Effect

Restricting photo spacers by recesses and grooves, it reduces the movable range of the photo spacers and prevents the photo spacers from generating a large displacement when subjected to an external force, thereby improving the stability of the photo spacers and preventing the display defects cause by the movement of the photo spacers.

DESCRIPTION OF DRAWINGS

In order to further understand the features and technical details of the present invention, please refer to the following detailed description and drawings regarding the present invention. The drawings are provided for reference and description only and are not intended to limit the present invention.

REFERENCE NUMERAL

10: color film substrate; 11: first substrate; 12: black matrix; 13: pixel layer; 14: protective layer; 20: thin film transistor substrate; 21: second substrate; 22: buffer layer; 23: semiconductor layer; 24: gate insulating layer; 25: interlayer insulating layer; 26: second metal layer; 27: flat layer; 271: via; 28: pixel electrode; 30: photo spacer; 31: first recess; 32: second recess; 40: first passivation layer; 41: first groove; 50: second passivation layer; 51: second groove; 60: recess; 70, touch layer.

DETAILED DESCRIPTION OF PREFERRED EMBODIMENTS

The following embodiments refer to the accompanying figures for exemplifying specific implementable embodiments of the present invention in a suitable computing environment. It should be noted that the exemplary described embodiments are configured to describe and understand the present invention, but the present invention is not limited thereto. Directional terms, such as an upper side, a lower side, a front side, a back side, a left side, a right side, an inner side, an outer side, and a lateral side, mentioned in the present invention are only for reference. Therefore, the directional terms are used for describing and understanding rather than limiting the present invention. In the figures, units having similar structures are used for the same reference numbers.

The present invention is directed to current liquid crystal display (LCD) panels. When photo spacers are subjected to an external force such as being squeezed or dropped, a positional movement occurs, and after the movement, it will destroy an alignment of alignment liquid and cause a disorder of liquid crystals, which forms a display defect such as a bright spot. The present invention can solve this problem.

First Embodiment

Figure 1:
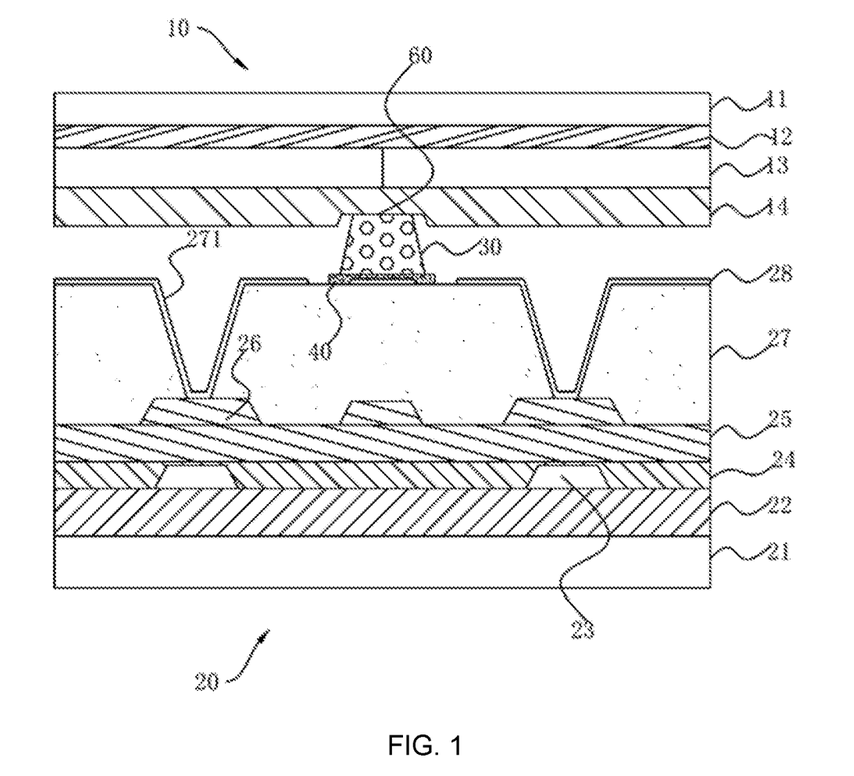
FIG. 1 is a schematic structural view of a liquid crystal display (LCD) panel according to a first embodiment of the present invention.

A LCD panel, as shown in FIG. 1, the LCD panel comprises a color film substrate 10, a thin film transistor substrate 20, and a photo spacer 30 disposed between the color film substrate 10 and the thin film transistor substrate 20.

It should be noted that, in the embodiment, the LCD panel is a non-in-line touch liquid crystal panel.

The photo spacer 30 is disposed on the thin film transistor substrate 20, and the color filter substrate 10 is provided with a recess 60 that is nested with the photo spacer 30.

When the photo spacer 30 is subjected to an external force, the recess 60 restricts the photo spacer 30, thereby reducing the movable range of the photo spacer 30, and improving the stability of the photo spacer 30 and preventing the display defects cause by the movement of the photo spacer 30.

The color filter substrate 10 comprises a first substrate 11, a black matrix 12, a pixel layer 13, and a protective layer 14 which are sequentially stacked. The photo spacer 30 is disposed on the thin film transistor substrate 20, and the recess 60 is disposed on the protective layer 14.

By disposing the photo spacer 30 on the thin film transistor substrate 20, and disposing the recess 60, which restricts the photo spacer 30, on the protective layer 14 of the color filter substrate 10, when the thin film transistor substrate 20 and the color filter substrate 10 are stacked and integrated, the photo spacer 30 is inserted into the recess 60, which is convenient and quick, and has higher stability to combine with each other.

Specifically, the recess 60 is formed by exposure etching on the protective layer 14 by a halftone mask process.

The thin film transistor substrate 20 comprises a second substrate 21, and a buffer layer 22 and a semiconductor layer 23 which are sequentially stacked on the second substrate 21. The buffer layer 22 is provided with a gate insulating layer 24 covering the semiconductor layer 23. The gate insulating layer 24 is provided with an interlayer insulating layer 25. The interlayer insulating layer 25 is provided with a second metal layer 26 and a flat layer 27 covering the second metal layer 26. A pixel electrode 28 is disposed on the flat layer 27.

Further, the flat layer 27 is provided with at least two spaced-apart vias 271, and the photo spacer 30 is disposed between two adjacent vias 271.

The photo spacer 30 is disposed between the two adjacent vias 271 on the flat layer 27, which can reduce the size of the black matrix 12 required to block the photo spacer 30 while increasing the pixel aperture ratio.

Specifically, a first passivation layer 40 is disposed on the pixel electrode 28, and the photo spacer 30 is disposed on the first passivation layer 40.

The connection strength between the photo spacer 30 and the thin film transistor substrate 20 is increased by the first passivation layer 40, thereby improving the stability of the photo spacer 30 and preventing large movement of the photo spacer 30.

Based on the above LCD panel, the present invention further provides a color filter substrate 10 based on the above LCD panel, which comprises a first substrate 11, a black matrix 12 disposed on the first substrate 11, a pixel layer 13 disposed on the black matrix 12, and a protective layer 14 disposed on the pixel layer 13.

Wherein the protective layer 14 is provided with a recess 60. The recess 60 on the color filter substrate 10 is used for nesting with a photo spacer 30 on the thin film transistor substrate 20 to be integrated with the color filter substrate 10.

Based on the above LCD panel, the present invention further provides a thin film transistor substrate 20, which comprises a second substrate 21, a buffer layer 22 disposed on the second substrate 21, a semiconductor layer 23 disposed on the buffer layer 22, a gate insulating layer 24 disposed on the semiconductor layer 23, an interlayer insulating layer 25 disposed on the gate insulating layer 24, a second metal layer 26 disposed on the interlayer insulating layer 25, a flat layer 27 disposed on the interlayer insulating layer 25 and covering the second metal layer 26, and a pixel electrode 28 disposed on the flat layer 27.

Wherein the flat layer 27 is provided with at least two spaced-apart vias 271. A photo spacer 30 is disposed on the flat layer 27 between two adjacent vias 271. The photo spacer 30 on the color filter substrate 20 is used for nesting with a recess 60 on the thin film transistor substrate 20 to be integrated with the color filter substrate 10.

A schematic diagram of a preparation process of the thin film transistor substrate is shown in FIG. 2 to FIG. 7.

Figure 2:
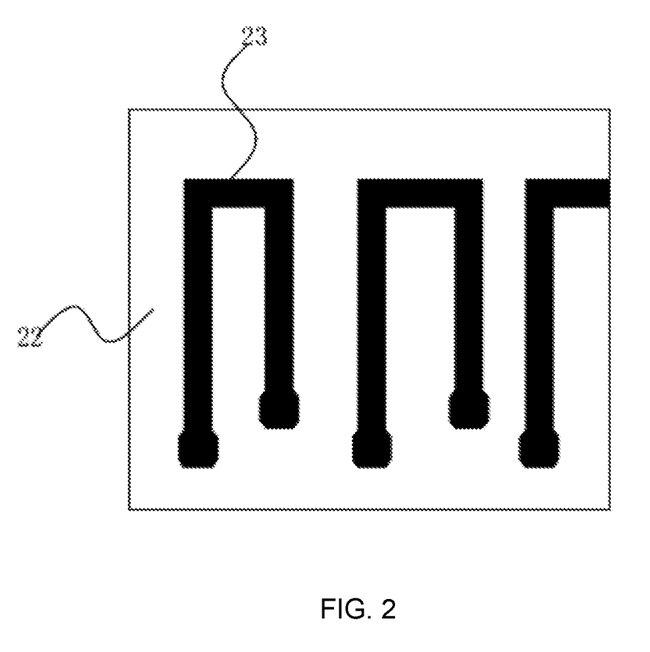
FIG. 2 to FIG. 7 are schematic diagrams showing a preparation process of a thin film transistor substrate according to an embodiment of the present invention.

As shown in FIG. 2, the buffer layer 22 is formed on the second substrate 21, and the patterned semiconductor layer 23 is formed on the buffer layer 22.

Figure 3:
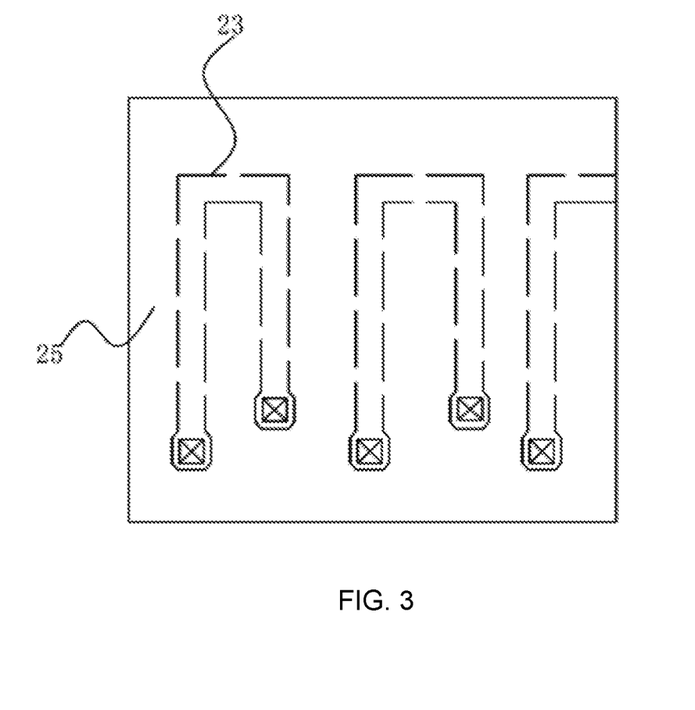

As shown in FIG. 3, the gate insulating layer 24 and the interlayer insulating layer 25 covering the semiconductor layer 23 are formed on the buffer layer 22, and a first overlapping hole passing through the interlayer insulating layer 25 and the gate insulating layer 24 is formed on the interlayer insulating layer 25.

Figure 4:
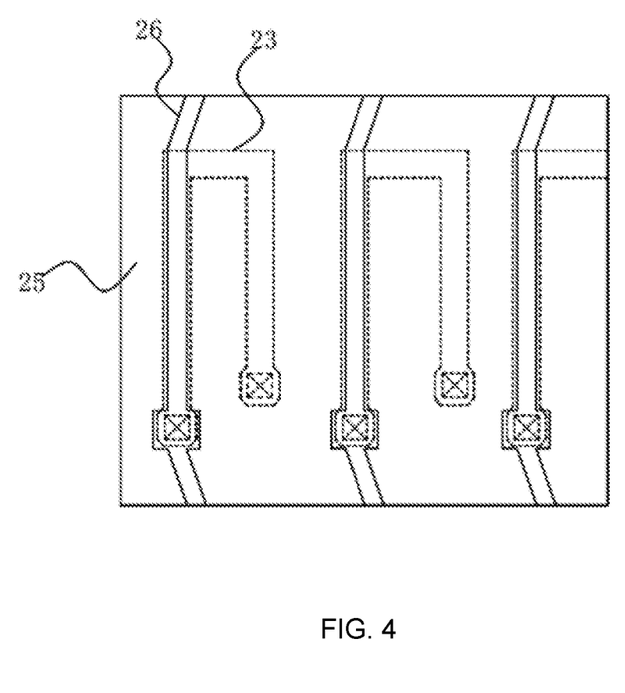

As shown in FIG. 4, a second metal layer 26 is formed on the interlayer insulating layer 25, and the second metal layer 26 is etched to form source-drain metal traces and data metal traces.

Figure 5:
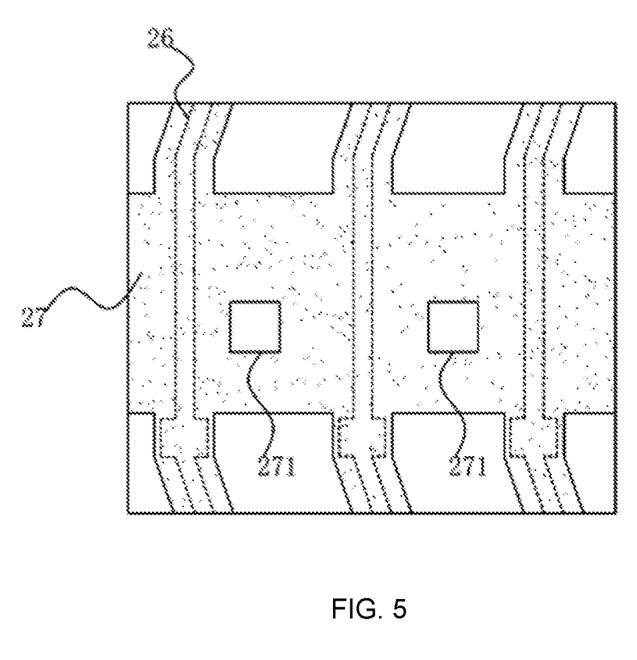

As shown in FIG. 5, the flat layer 27 covering the second metal layer 26 is formed, and at least two spaced-apart vias 271 are formed on both sides of the flat layer 27.

Figure 6:
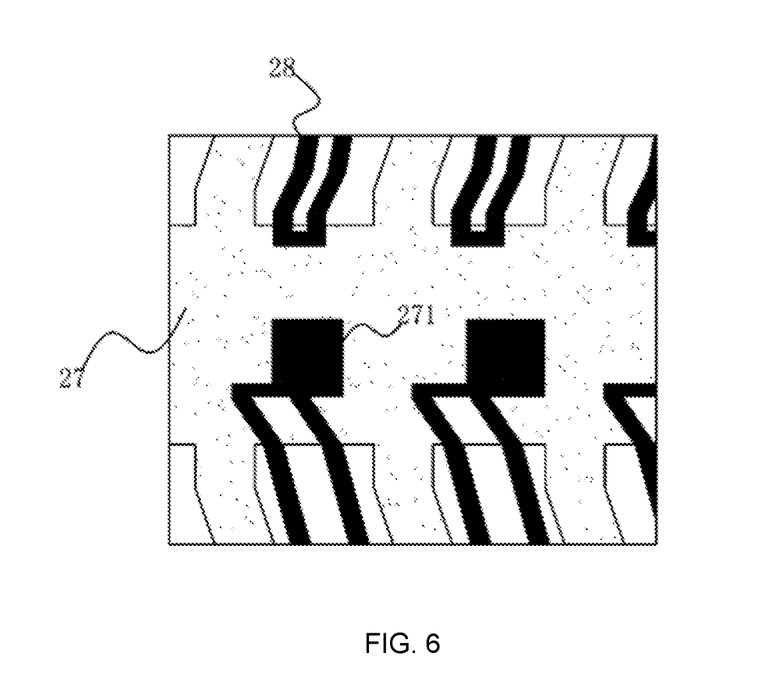

As shown in FIG. 6, the patterned pixel electrode 28 is formed on the flat layer 27.

Figure 7:
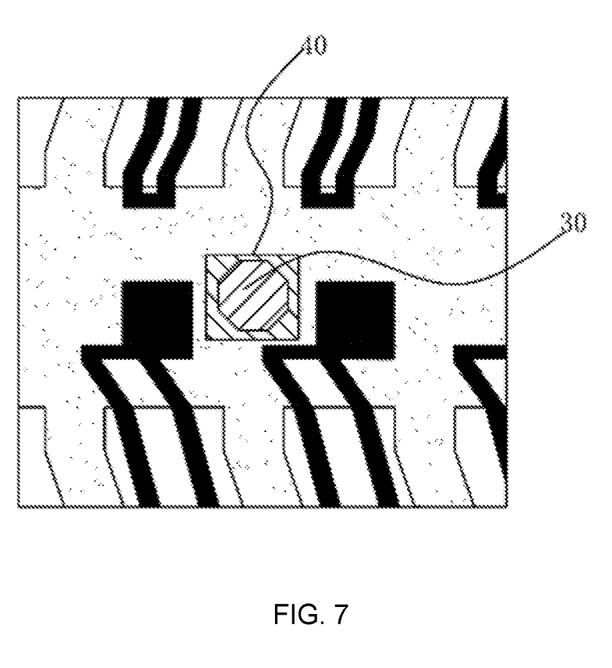

As shown in FIG. 7, the first passivation layer 40 is formed. The first passivation layer 40 is disposed between two adjacent vias 271, and a photo spacer 30 is disposed on the first passivation layer 40.

Second Embodiment

Figure 8:
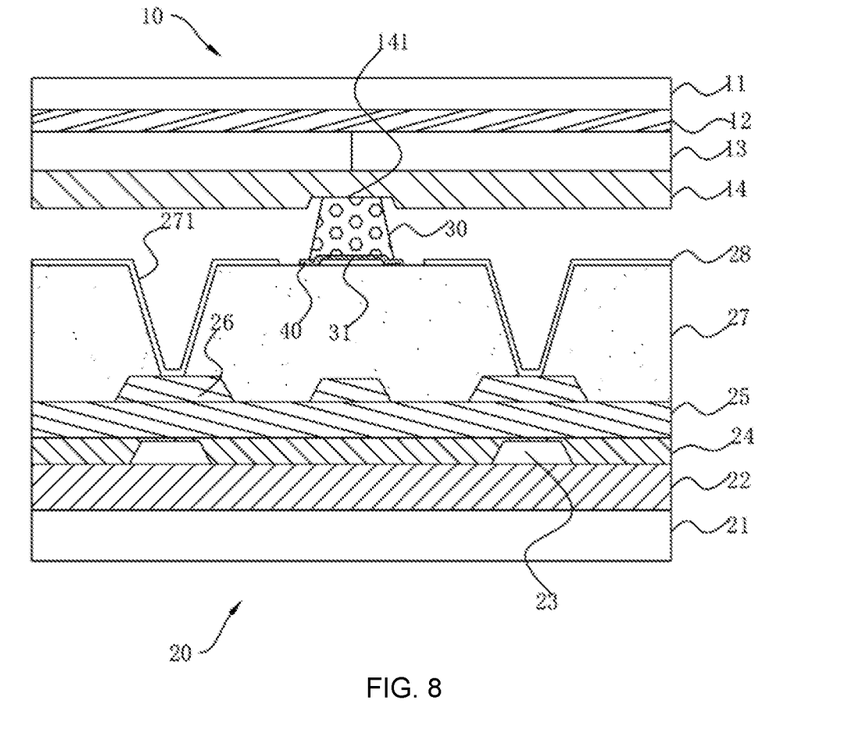
FIG. 8 is a schematic structural view of a LCD panel according to a second embodiment of the present invention.

A liquid crystal display panel, as shown in FIG. 8, is different from the first embodiment only in that the photo spacer 30 and the first passivation layer 40 are connected by a connection structure.

Specifically, the connection structure comprises a first protrusion disposed at a top of the first passivation layer 40 and a first recess 31 disposed at a bottom of the photo spacer 30 and inserted by the first protrusion.

Third Embodiment

Figure 9:
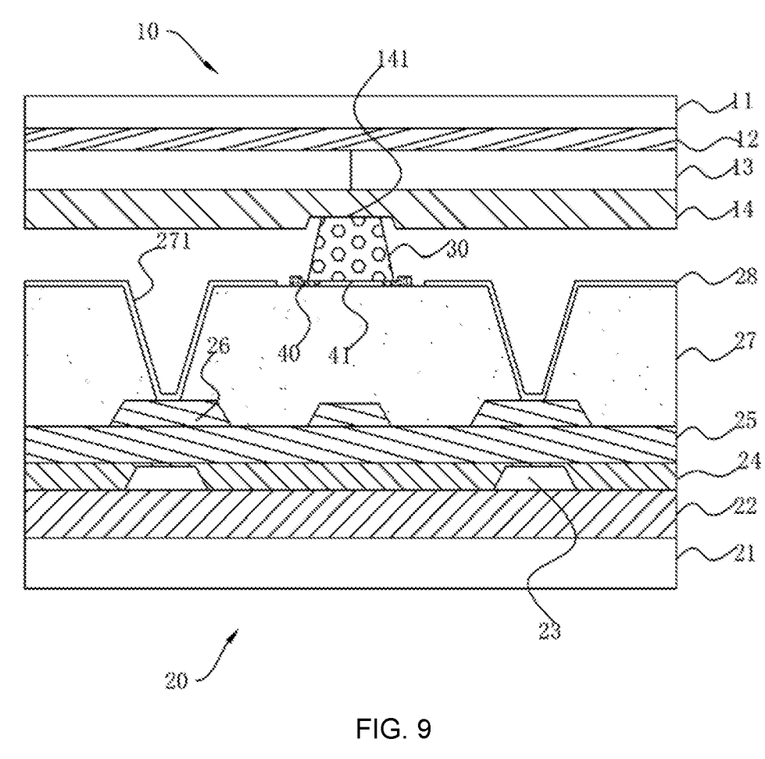
FIG. 9 is a schematic structural view of a LCD panel according to a third embodiment of the present invention.

A LCD panel, as shown in FIG. 9, is different from the second embodiment only in that the connection structure between the photo spacer 30 and the first passivation layer 40 is different.

Specifically, the connection structure comprises a first recess 41 disposed on the first passivation layer 40 and inserted by the photo spacer 30.

Fourth Embodiment

Figure 10:
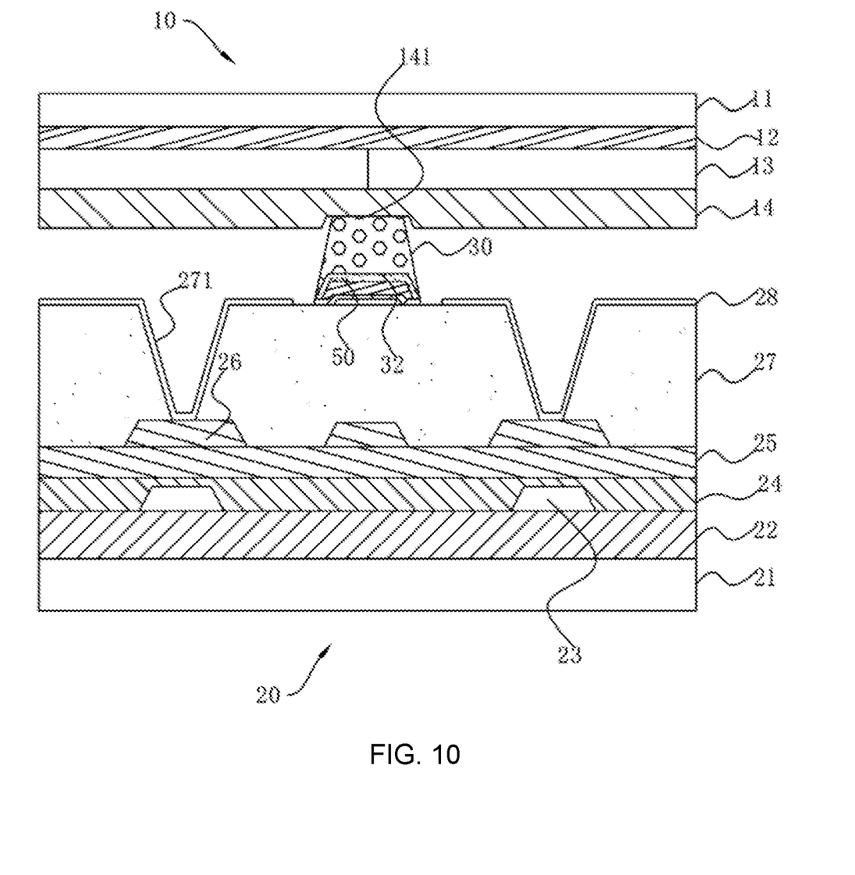
FIG. 10 is a schematic structural view of a LCD panel according to a fourth embodiment of the present invention.

A LCD panel, as shown in FIG. 10, the LCD panel comprises a color filter substrate 10, a thin film transistor substrate 20, and a photo spacer 30 between the color filter substrate 10 and the thin film transistor substrate 20.

It should be noted that, in the preferred embodiment, the LCD panel is an in-cell touch liquid crystal panel.

The photo spacer 30 is disposed on the thin film transistor substrate 20, and the color filter substrate 10 is provided with a recess 60 that is nested with the photo spacer 30.

When the photo spacer 30 is subjected to an external force, the recess 60 restricts the photo spacer 30, thereby reducing the movable range of the photo spacer 30, and improving the stability of the photo spacer 30 and preventing the display defects cause by the movement of the photo spacer 30.

The color filter substrate 10 comprises a first substrate 11, a black matrix 12, a pixel layer 13, and a protective layer 14 which are sequentially stacked. The photo spacer 30 is disposed on the thin film transistor substrate 20, and the recess 60 is disposed on the protective layer 14.

By disposing the photo spacer 30 on the thin film transistor substrate 20, and disposing the recess 60, which restricts the photo spacer 30, on the protective layer 14 of the color filter substrate 10, when the thin film transistor substrate 20 and the color filter substrate 10 are stacked and integrated, the photo spacer 30 is inserted into the recess 60, which is convenient and quick, and has higher stability to combine with each other.

Specifically, the recess 60 is formed by exposure etching on the protective layer 14 by a halftone mask process.

The thin film transistor substrate 20 comprises a second substrate 21, and a buffer layer 22 and a semiconductor layer 23 which are sequentially stacked on the second substrate 21. The buffer layer 22 is provided with a gate insulating layer 24 covering the semiconductor layer 23. The gate insulating layer 24 is provided with an interlayer insulating layer 25. The interlayer insulating layer 25 is provided with a second metal layer 26 and a flat layer 27 covering the second metal layer 26. A pixel electrode 28 is disposed on the flat layer 27.

Further, the flat layer 27 is provided with at least two spaced-apart vias 271, and the photo spacer 30 is disposed between two adjacent vias 271.

The photo spacer 30 is disposed between the two adjacent vias 271 on the flat layer 27, which can reduce the size of the black matrix 12 required to block the photo spacer 30 while increasing the pixel aperture ratio.

Specifically, the pixel electrode 28 is provided with a touch layer 70, and the photo spacer 30 is disposed above the touch layer 70.

Further, a second passivation layer 50 is disposed on the top of the touch layer 70, and the photo spacer 30 is disposed on the second passivation layer 50.

The connection strength between the photo spacer 30 and the thin film transistor substrate 20 is increased by the second passivation layer 50, thereby improving the stability of the photo spacer 30 and preventing large movement of the photo spacer 30.

The second passivation layer 50 is provided with a second protrusion at a top thereof, and a bottom of the photo spacer 30 is provided with a second recess 32 for inserting the second protrusion.

Based on the above LCD panel, the present invention further provides a color filter substrate 10, which comprises a first substrate 11, a black matrix 12 disposed on the first substrate 11, a pixel layer 13 disposed on the black matrix 12, and a protective layer 14 disposed on the pixel layer 13.

Wherein the protective layer 14 is provided with a recess 60. The recess 60 on the color filter substrate 10 is used for nesting with a photo spacer 30 on the thin film transistor substrate 20 to be integrated with the color filter substrate 10.

Based on the above LCD panel, the present invention further provides a thin film transistor substrate 20, which comprises a second substrate 21, a buffer layer 22 disposed on the second substrate 21, a semiconductor layer 23 disposed on the buffer layer 22, a gate insulating layer 24 disposed on the semiconductor layer 23, an interlayer insulating layer 25 disposed on the gate insulating layer 24, a second metal layer 26 disposed on the interlayer insulating layer 25, a flat layer 27 disposed on the interlayer insulating layer 25 and covering the second metal layer 26, and a pixel electrode 28 disposed on the flat layer 27.

Wherein the flat layer 27 is provided with at least two spaced-apart vias 271. A photo spacer 30 is disposed on the flat layer 27 between two adjacent vias 271. The photo spacer 30 on the color filter substrate 20 is used for nesting with a recess 60 on a thin film transistor substrate 20 to be integrated with the color filter substrate 10.

Specifically, the pixel electrode 28 is provided with a touch layer 70, and the photo spacer 30 is disposed above the touch layer 70.

Further, a second passivation layer 50 is disposed on the top of the touch layer 70, and the photo spacer 30 is disposed on the second passivation layer 50.

Further, the photo spacer 30 and the second passivation layer 50 are connected by a connection structure. The connection structure comprises a second protrusion disposed at a top of the second passivation layer 50 and a second recess 32 disposed at a bottom of the photo spacer 30 and for inserting the second protrusion.

Fifth Embodiment

Figure 11:
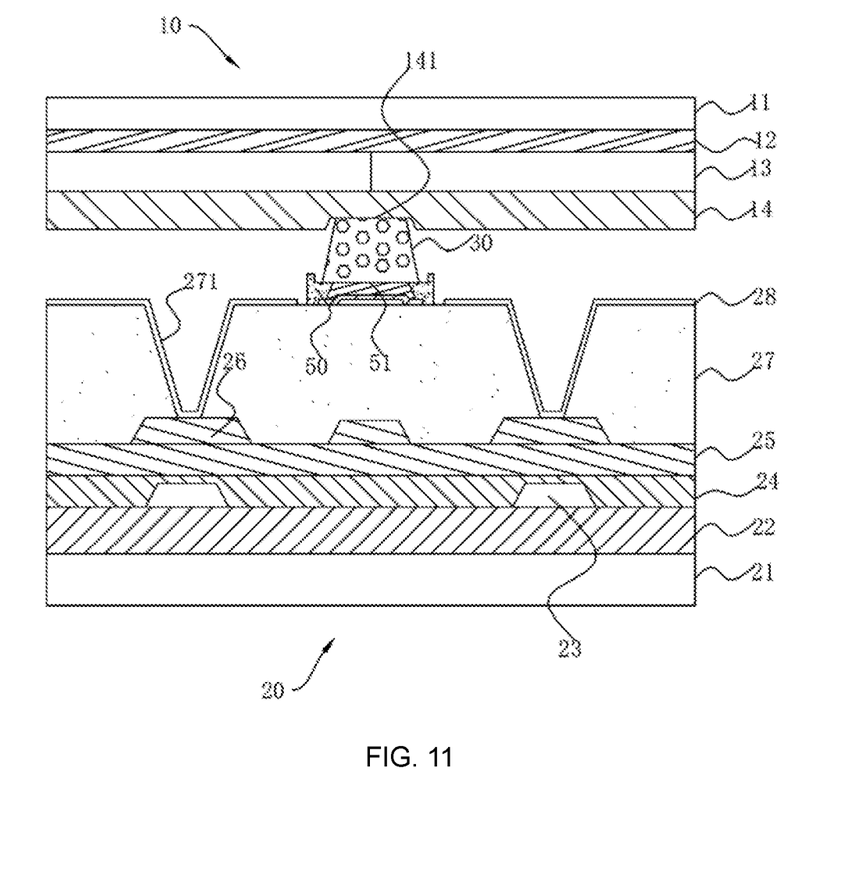
FIG. 11 is a schematic structural view of a LCD panel according to a fifth embodiment of the present invention.

A LCD panel, as shown in FIG. 11, is different from the fourth embodiment only in that the connection structure between the photo spacer 30 and the second passivation layer 50 is different.

Specifically, the connection structure comprises a second recess 51 disposed on the second passivation layer 50 and inserted into the spacer 30.

Sixth Embodiment

Figure 12:
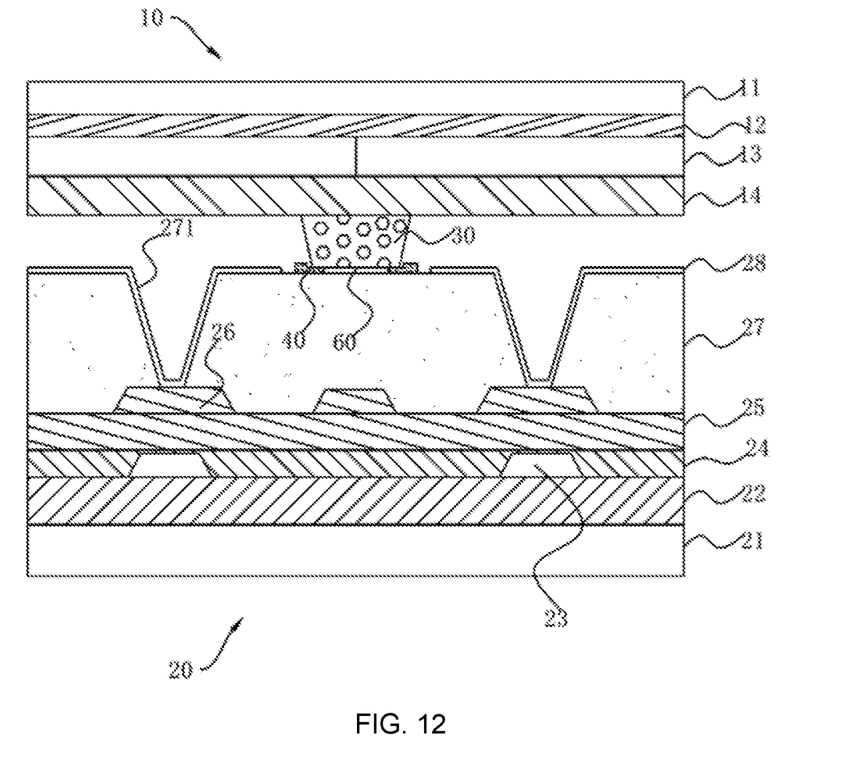
FIG. 12 is a schematic structural view of a LCD panel according to a sixth embodiment of the present invention.

A LCD panel, as shown in FIG. 12, is different from the first embodiment only in that the photo spacer 30 and the recess 60 are disposed at different positions.

Specifically, the spacer 30 is disposed on the protective layer 14, and the recess 60 is disposed on the first passivation layer 40 of the thin film transistor substrate 20.

Seventh Embodiment

Figure 13:
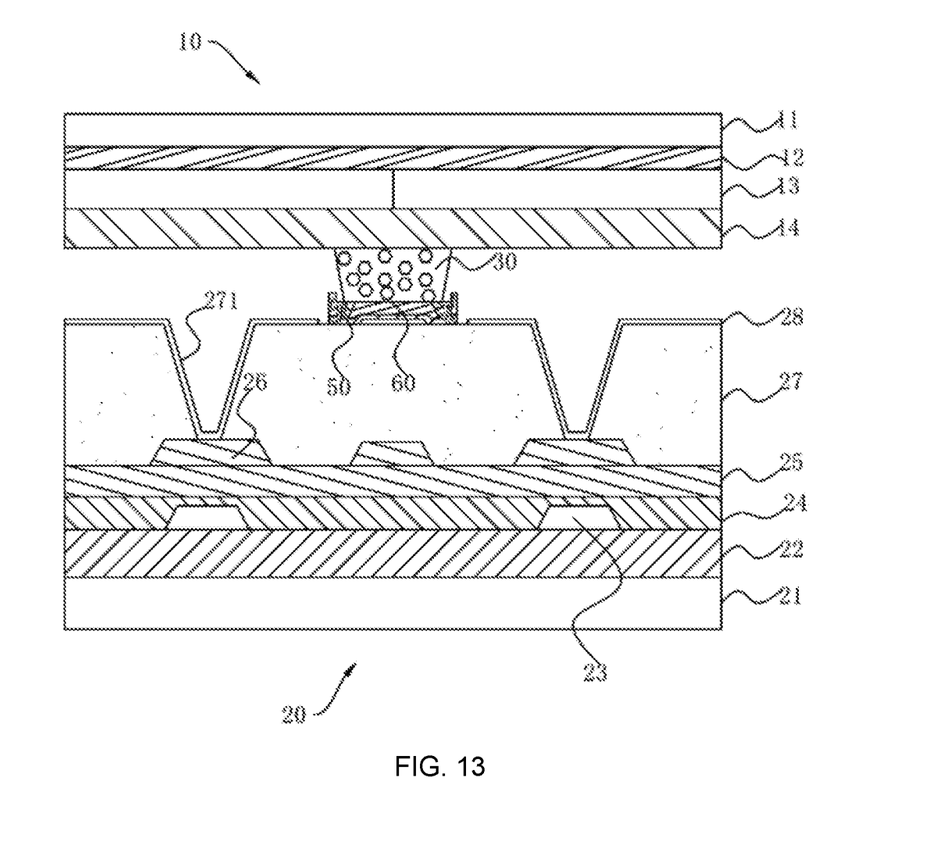
FIG. 13 is a schematic structural view of a LCD panel according to a seventh embodiment of the present invention.

A LCD panel, as shown in FIG. 13, is different from the fourth embodiment only in that the second convex portion and the second concave portion 32 are removed, and in the present embodiment, the position where the photo spacer 30 and the recess 60 disposed is different from the position where the photo spacer 30 and the recess 60 disposed in the fourth embodiment.

Specifically, the photo spacer 30 is disposed on the color filter substrate 10, and the recess 60 is disposed on the second passivation layer 50.

Eighth Embodiment

Figure 14:
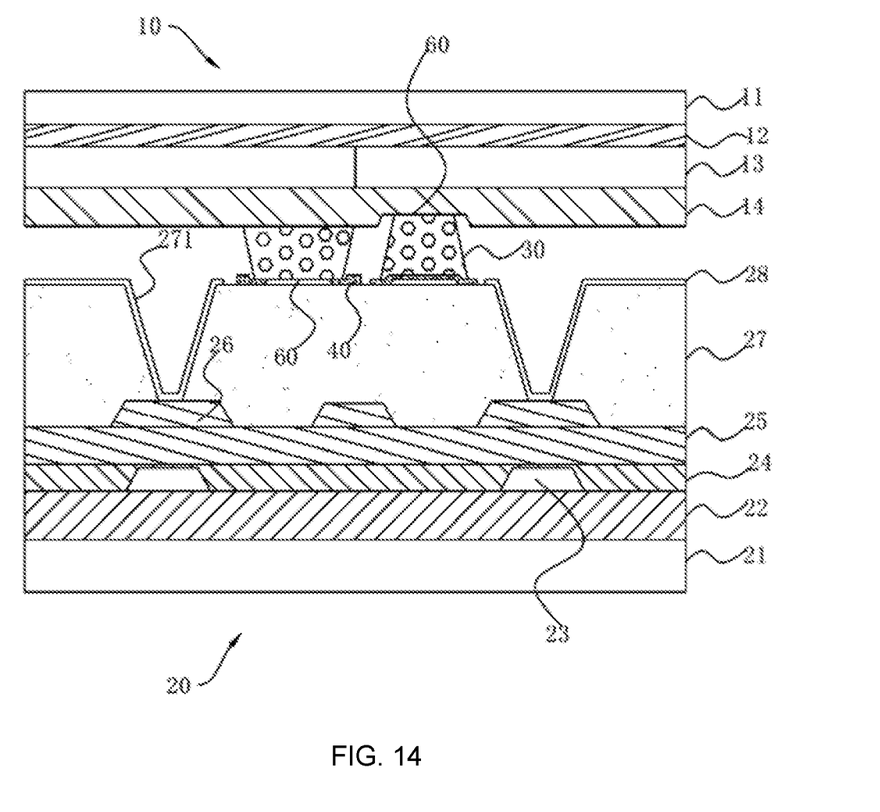
FIG. 14 is a schematic structural view of a LCD panel according to an eighth embodiment of the present invention.

A LCD panel, as shown in FIG. 14, is different from the first embodiment only in that the photo spacer 30 and the recess 60 are disposed at different positions.

Specifically, the color filter substrate 10 and the thin film transistor substrate 20 are provided with a photo spacer 30 and a recess 60. The recess 60 on the color filter substrate 10 is nested with the photo spacer 30 on the thin film transistor substrate 20. The recess 60 on the thin film transistor substrate 20 is nested with the photo spacer 30 on the color filter substrate 10.

The beneficial effects of the invention are: Restricting the photo spacer 30 by recess 60 and grooves, it reduces the movable range of the photo spacer 30 and prevents the photo spacer 30 from generating a large displacement when subjected to the external force, thereby improving the stability of the photo spacer 30 and preventing the display defects cause by the movement of the photo spacer 30.

In the above, various other corresponding changes and modifications can be made according to the technical solutions and technical ideas of the present invention to those skilled in the art, and all such changes and modifications are within the scope of the claims of the present invention.

What is claimed is:

1. A liquid crystal display (LCD) panel, the LCD panel comprising:
    a color film substrate, wherein the color film substrate comprises a first substrate, a pixel layer disposed on the first substrate, and a protective layer disposed on the pixel layer, and wherein a surface of the protective layer away from the first substrate is defined with a recess;
    a thin film transistor substrate, wherein the thin film transistor substrate comprises a second substrate, a second metal layer disposed on the second substrate, a flat layer covering the second metal layer, a pixel electrode disposed on the flat layer, and a first passivation layer disposed on the pixel electrode; and
    photo spacers disposed between the color film substrate and the thin film transistor substrate;
    wherein the flat layer is defined with vias, and two of the photo spacers are disposed between corresponding two adjacent vias; and
    wherein a narrow end and a wide end of one of the two photo spacers respectively fall into the recess of the protective layer and abut against the first passivation layer, and a narrow end and a wide end of another one of the two photo spacers respectively fall into a recess of the first passivation layer and abut against the protective layer.

2. The LCD panel as claimed in claim 1, wherein the thin film transistor substrate further comprises:
    a semiconductor layer disposed on the second substrate;
    a gate insulating layer disposed on the semiconductor layer; and
    an interlayer insulating layer disposed on the gate insulating layer.

3. The LCD panel as claimed in claim 1, wherein a top of the first passivation layer is provided with a first convex portion, and a bottom of one of the two photo spacers is provided with a first concave portion for inserting the first convex portion.

* * * * *

UNITED STATES PATENT AND TRADEMARK OFFICE
CERTIFICATE OF CORRECTION

PATENT NO. : 11,287,708 B2
APPLICATION NO. : 16/613916
DATED : March 29, 2022
INVENTOR(S) : Qipei Zhang et al.

It is certified that error appears in the above-identified patent and that said Letters Patent is hereby corrected as shown below:

On the Title Page

Item (73) Assignee, "Wuhan Ching Star Optoelectronies Technology Co., Ltd." should be changed to: --Wuhan China Star Optoelectronics Technology Co., Ltd.--

Signed and Sealed this
First Day of November, 2022

Katherine Kelly Vidal
*Director of the United States Patent and Trademark Office*